United States Patent
Joachim et al.

(10) Patent No.: US 7,305,901 B2
(45) Date of Patent: Dec. 11, 2007

(54) RACK-AND-PINION STEERING

(75) Inventors: Franz-Josef Joachim, Bodolz (DE); Jens-Uwe Hafermalz, Waeschenbeuren (DE); Rainer Schaenzel, Essingen (DE); Karl Benkler, Garmisch-Partenkirchen (DE); Hartmut Specht, Alfdorf (DE); Hermann Ocker, Schwaebisch Gmuend (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 387 days.

(21) Appl. No.: 10/499,494

(22) PCT Filed: Jun. 5, 2003

(86) PCT No.: PCT/EP03/05912

§ 371 (c)(1),
(2), (4) Date: Jul. 19, 2004

(87) PCT Pub. No.: WO03/104064

PCT Pub. Date: Dec. 18, 2003

(65) Prior Publication Data

US 2005/0034916 A1   Feb. 17, 2005

(30) Foreign Application Priority Data

Jun. 11, 2002   (DE) ............................... 102 25 718

(51) Int. Cl.
*F16H 1/04*   (2006.01)
(52) U.S. Cl. ..................................... 74/422; 74/388 PS
(58) Field of Classification Search ............ 74/388 PS, 74/422, 492, 498; 180/443, 444, 446; 280/67
See application file for complete search history.

(56) References Cited

U.S. PATENT DOCUMENTS

| 5,307,892 A | * | 5/1994 | Phillips | ....................... 180/422 |
| 5,379,856 A | | 1/1995 | Blee | |
| 5,845,532 A | * | 12/1998 | Phillips | ....................... 74/422 |
| 6,142,031 A | * | 11/2000 | Phillips | ....................... 74/422 |
| 6,178,843 B1 | * | 1/2001 | Machida et al. | ............... 74/498 |

FOREIGN PATENT DOCUMENTS

| DE | 6 91 517 | 5/1940 |
| DE | 10 75 959 | 2/1960 |
| DE | 19 15 219 | 8/1970 |
| DE | 42 43 267 | 6/1994 |
| DE | 200 08 629 | 8/2000 |
| DE | 199 37 254 | 2/2001 |
| EP | 1 167 158 | 1/2002 |
| GB | 766 141 | 1/1957 |
| GB | 1 219 471 | 1/1971 |

\* cited by examiner

*Primary Examiner*—Richard Ridley
*Assistant Examiner*—James Pilkington
(74) *Attorney, Agent, or Firm*—Jordan and Hamburg LLP

(57) ABSTRACT

A rack-and-pinion steering system, in particular for a motor vehicle, has a steering housing and a pinion which is inserted into the steering housing If. A rack whose toothing engages with the pinion is mounted so as to be axially displaceable in the steering housing. The rack-and-pinion steering system has a circulation lubrication system with lubricating oil, an arrangement for conveying lubricating oil from a lubricating-oil reservoir conveying lubricating oil to the toothing engagement location between the rack and the pinion.

6 Claims, 1 Drawing Sheet

RACK-AND-PINION STEERING

BACKGROUND OF THE INVENTION

Figure 1:
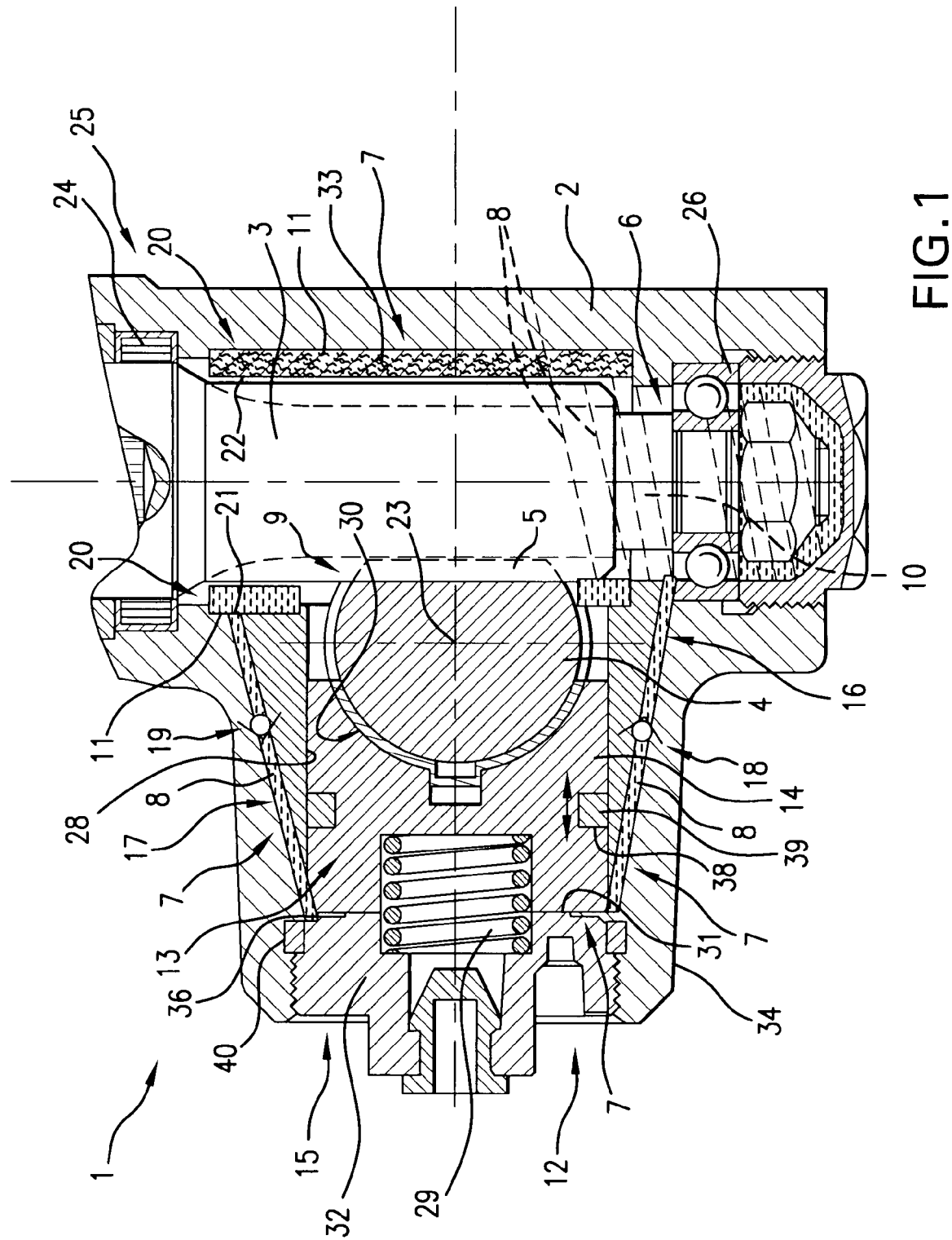

The invention relates to a rack-and-pinion steering system, in particular for a motor vehicle.

Rack-and-pinion steering systems which can also be configured as hydraulic rack-and-pinion steering systems or electrical power steering systems or power assisted steering systems are known from "Fahrwerktechnik: Lenkung" ["Chassis technology: Steering"], J. Reimpell, Vogel-Buchverlag, 1984, pages 70-90.

The rack-and-pinion steering system is substantially formed from a cylindrical steering housing in which a rack is arranged so as to be axially movable. One end, configured as a pinion, of a steering column is inserted either -centrally or laterally into the steering housing in a bore approximately transversely with respect to the longitudinal axis of the steering housing and mounted via a pinion bearing. The pinion meshes with toothing of the rack. The rack or the pinion are held in contact with one another using a pressure piece inserted in an axial guide of the steering housing.

Steering tie rods are connected to the rack at the axial ends of the latter in an articulated manner and are displaced with the rack when the pinion rotates.

Steering mechanisms of this type having a sliding motion are provided in a known manner with a lifetime lubricating grease filling. If the rack-and-pinion steering system is configured as an electrical power steering system or power assisted steering system, the pinion is driven via a gear mechanism of an electric motor.

If high steering moments and steering speeds occur during operation, the result can be increased wear, scoring or even pitting. As a result, the steering play is increased and disruptive noise from the rack-and-pinion steering system results.

SUMMARY OF THE INVENTION

The invention is based on the object of developing a rack-and-pinion steering system of the generic type in such a way that wear to the rack-and-pinion steering system is minimized with high operational reliability.

In order to improve the lubrication of the rack-and-pinion steering system over the entire temperature range (−40° C. to 130° C.) in which the rack-and-pinion steering system is operated, there is provision according to the invention for assigning a lubricating-oil reservoir to the rack-and-pinion steering system and providing actively or passively acting means for conveying lubricating oil from the lubricating-oil reservoir to the toothing engagement location between the rack and the pinion.

In order to minimize the loss of lubricating oil in the event of damage, in particular to folding bellows on the steering housing which seal off the steering housing with respect to the steering tie rods, the amount of lubricating oil is kept low and preferably accommodated in an oil pocket in the steering housing itself. The lubrication of the rack-and-pinion steering system is thus effected as circulation lubrication, it being possible to configure the means for conveying lubricating oil in many ways.

In order to minimize costs it can be expedient to arrange a simple body made from a material having a capillary action in the steering housing in order to convey lubricating oil from the lubricating-oil reservoir to the toothing engagement location. For this purpose, a strip or ring made from a felt, from an oil-resistant soft foam or a woven fabric is suitable, for instance. Here, the lubricating oil can be returned into the lubricating-oil reservoir by the effect of gravity in the steering housing, in grooves or bores in the steering housing.

The means for conveying lubricating oil can comprise, exclusively or in addition to the body made from a material having a capillary action, a mechanical oil pump. The oil pump can be formed substantially from components of the rack-and-pinion steering system. Here, a pressure piece of a pressure-exerting device for pressing the rack and pinion against one another serves as a piston of the oil pump. During operation of the rack-and-pinion steering system, the pressure piece is axially displaced intermittently in the bore in which it is guided in the steering housing in a sliding manner, with the result that an intermediate space between the pressure piece and a cover closing off the pressure piece bore to the outside can be used as a conveying space for conveying lubricating oil. The lubricating oil is conveyed with the aid of the pressure piece via ducts or bores in the steering housing which lead from the lubricating-oil reservoir to lubricating-oil dispensing points of the rack-and-pinion steering system via the conveying space. The conveying direction is determined by nonreturn valves, preferably by nonreturn ball valves in the ducts. This prevents the lubricating oil from flowing back in the ducts.

The pinion of the rack-and-pinion steering system can also be connected fixedly to a gear mechanism or stepdown gear mechanism of an electric motor so as to rotate with it, and the gear mechanism can also be integrated into the steering housing of the rack-and-pinion steering system. It is then expedient to supply lubricating oil to the toothing systems of the gear mechanism using the means for conveying lubricating oil.

Additionally, it can be expedient to supply lubricating oil to the bearings of the rack-and-pinion steering system and of the gear mechanism in the abovementioned manner. In this way, constant lubrication of the rack-and-pinion steering system is ensured with a small amount of lubricating oil in circulation. Only small amounts of oil can pass into the surroundings in the event of a possible leak from the rack-and-pinion steering system. In order to almost completely rule out a possible loss of lubricating oil of this type, it is expedient to arrange a body made from a material having a capillary action for storing the lubricating oil in the lubricating-oil reservoir. In this way, the amount of free lubricating oil in the rack-and-pinion steering system is minimized. Here, the body for storing the lubricating oil can be formed from a different or the same material as the body for conveying lubricating oil.

Means for distributing lubricating oil, such as feltlike or brushlike pieces for instance, can be arranged at the lubricating-oil dispensing points, in particular for distributing lubricating oil onto the respective toothing engagement location uniformly and over the entire area. Annular, feltlike means for distributing lubricating oil can also be arranged there. The dispensing of lubricating oil to the respective working location can be assisted by additional means, which exert intermittent pressure, for instance, on the feltlike, spongelike or brushlike bodies.

The rack passes through oil-stripping rings for returning lubricating oil which adheres to said rack. In each case one oil return bore is expediently arranged in the steering housing at the axial ends of the steering housing for returning lubricating oil from folding bellows which cover the steering tie rods at the ends of the steering housing. Here, lubricating oil is conveyed from the interior spaces of the folding bellows to the lubricating-oil reservoir through the oil return bore when the folding bellows are compressed.

One exemplary embodiment of the invention is shown in the following text using the drawing.

IN THE DRAWING

FIG. 1 shows a longitudinal section through a rack-and-pinion steering system along the longitudinal axes of the pinion and of the pressure piece.

DESCRIPTION OF THE PREFERRED EMBODIMENTS

FIG. 1 shows details of a longitudinal section through a rack-and-pinion steering system 1 in the region of the steering column opening for a motor vehicle. A steering housing 2 accommodates a pinion 3 in a first pinion bearing 24 at its steering column opening 25, approximately transversely with respect to its longitudinal axis 23. The pinion 3 engages with toothing 5 of a rack 4 which is displaceably mounted axially in the steering housing 2. The pinion 3 is inserted and held in the steering housing 2 axially and radially by a further, second pinion bearing 26 which is arranged at the pinion tip at a distance from the first pinion bearing 24.

A pressure piece 14 of a pressure-exerting apparatus 15 is guided so as to be axially displaceable in the steering housing 2 along a cylindrical bore 28 which is arranged transversely with respect to the longitudinal axis 27 of the pinion 3 and transversely with respect to the longitudinal axis 23 of the steering housing 2. A sliding surface 30 of semicircular cross section of the pressure piece 14 presses onto the rack 4 under the action of a compression spring 29 and holds the toothing 5 of said rack 4 in engagement with the pinion 3. The compression spring 29 is supported between a pressure piece base 31 and a cover 32 which closes off the bore 28 to the outside.

In order to lubricate the rack-and-pinion steering system 1, a lubricating-oil reservoir 6 configured as an oil pocket 10 in the region of the second pinion bearing 26 is provided in the steering housing 2. Here, the lubrication of the mechanical gear mechanism having a sliding movement is effected in the manner of circulation lubrication, various means 7 for conveying lubricating oil 8 from the lubricating-oil reservoir 6 to the toothing engagement location 9 between the rack 4 and the pinion 3 being shown.

For this purpose, in a simple manner, a body 11 made from a material having a capillary action, such as for instance an elongate felt strip 33 several millimeters in thickness and shown in the exemplary embodiment, can dip into the oil pocket 10 and be guided along on the pinion 3 over the entire tooth length of the pinion 3. A soft foam, a woven fabric or the like having a wicking effect is also suitable as the material having a capillary action.

The body 11 continuously releases lubricating oil 8 to the pinion 3, said lubricating oil 8 being sucked from the oil pocket 10. The lubricating oil 8 subsequently flows back to the oil pocket 10. It can also be expedient to guide the body 11 around the pinion 3 and/or the rack as a cylindrical structure and to configure it partially in contact with the rack 4 in order to lubricate the latter.

As an alternative or together with the embodiment shown of a means 7 for conveying lubricating oil 8, it can be expedient to provide an oil pump 12 for lubricating the rack-and-pinion steering system 1. This is suitable, in particular, when, for example, the axial regions of the rack 4 or bearings, such as the first pinion bearing 24 on the rack-and-pinion steering system 1, are to be supplied with lubricating oil.

In the exemplary embodiment shown, the oil pump 12 is formed from components of the rack-and-pinion steering system 1 itself. The oil pump 12 is formed as a piston pump with the pressure piece 14 as piston and the bore 28 in the steering housing 2 as cylinder. Here, an intake duct 16 for lubricating oil 8 is routed in the steering housing 2 from one opening at the oil pocket 10 to an opening 34 into the bore 28 and, as seen in the axial direction of the bore 28, between the cover 32 and the pressure piece base 31. The intake duct 16 has a nonreturn ball valve 18 which, in the event of a stroke of the pressure piece, makes it possible for the lubricating oil 8 to be sucked into the conveying space between the cover 32 and pressure piece base but does not make it possible for said lubricating oil 8 to flow back into the oil pocket 10.

In the same way, a duct 17 is routed in the steering housing 2 from an opening 36, situated diametrically with respect to the opening 34, from the conveying space to oil dispensing points 21 and 22 in the region of the pinion 3 near the first bearing 24. The duct 17 has a nonreturn valve 19 which permits the flow of lubricating oil from the oil pump to the oil dispensing points 21, 22 but not vice versa.

During operation of the rack-and-pinion steering system 1, the pressure piece 14 executes a stroke counter to the compressive force of the compression spring 29 and vice versa when a torque is introduced into the pinion 3 by rack forces. In the event of forces which are introduced onto the rack 4 by the roadway via the steering tie rods, the same conditions occur at the toothing of the pinion and of the rack, with the result that the pressure piece is capable of conveying lubricating oil permanently.

The pressure piece 14 is sealed off with respect to the bore 28 by an O-ring 39 inserted in a circumferential groove 38. The cover 32 is sealed off to the outside with an O-ring 40.

If the rack-and-pinion steering system 1 is configured as an electrical power steering system or power assisted steering system, the pinion 3 is driven via a stepdown gear mechanism which is not shown in the exemplary embodiment. The stepdown gear mechanism preferably forms one physical unit with the gear mechanism having a sliding movement, it being possible to supply lubricating oil to its toothing and bearings in the abovedescribed manner.

In order to prevent the lubricating oil 8 from escaping in the event of a possible leak from the rack-and-pinion steering system 1, it is expedient to arrange a body made from an absorbent material for storing the lubricating oil 8 in the lubricating-oil reservoir 6. The body for storing the lubricating oil 8 can be formed from the same material as or a different material than the body 11 for conveying lubricating oil 8.

Means 20 for distributing the lubricating oil 8, such as pieces of feltlike or foamlike material for instance, are arranged at the oil dispensing points 21 and 22, which means 20 ensure application of lubricating oil over the entire surface at the toothing engagement location 9. In its axial region, the rack 4 passes through oil-stripping rings which ensure that lubricating oil does not enter the folding bellows arranged axially on the steering housing 2. If, nevertheless, lubricating oil enters the folding bellows, it is conveyed back from the folding bellows into the steering housing via an oil return bore in the event of a displacement of the rack to its limit stop.

LIST OF DESIGNATIONS

1 Rack-and-pinion steering system
2 Steering housing
3 Pinion
4 Rack
5 Toothing on 4
6 Lubricating-oil reservoir
7 Means for conveying lubricating oil
8 Lubricating oil
9 Toothing engagement location
10 Oil pocket
11 Body
12 Oil pump
13 Piston of 12
14 Pressure piece
15 Pressure-exerting device
16 Duct
17 Duct
18 Nonreturn valve
19 Nonreturn valve
20 Means for distributing lubricating oil
21 Oil dispensing point
22 Oil dispensing point
23 longitudinal axis of 2
24 First pinion bearing
25 Steering column opening
26 Second pinion bearing
27 Longitudinal axis on 3
28 Cylindrical bore
29 Compression spring
30 Sliding surface
31 Pressure piece base
32 Cover
33 Felt tip, felt ring
34 Opening of 16
35
36 Opening of 17
37
38 Circumferential groove on 14
39 O-ring in 14
40 O-ring in 32
41
42
43
44
45
46
47
48
49
50

The invention claimed is:

1. A rack-and-pinion steering system, in particular for a motor vehicle, comprising a steering housing and a pinion which is inserted into the steering housing, and having a rack whose toothing engages with the pinion and which rack is mounted so as to be axially displaceable in the steering housing as a function of a revolution of the pinion, and having a lubricating-oil reservoir and a conveying system for conveying lubricating oil from the lubricating-oil reservoir to the toothing engagement location between the rack and the pinion, wherein the lubricating-oil reservoir and the system for conveying lubricating oil are arranged in the region of the toothing of the rack, and the lubricating-oil reservoir and the conveying system for conveying lubricating oil comprise bodies made from a material having a capillary action.

2. The rack-and-pinion steering system as claimed in claim 1, wherein the body for storing the lubricating oil is formed from a different material than the body for conveying lubricating oil.

3. A rack-and-pinion steering system, in particular for a motor vehicle, comprising a steering housing and a pinion which is inserted into the steering housing, and having a rack whose toothing engages with the pinion and which rack is mounted so as to be axially displaceable in the steering housing as a function of a revolution of the pinion, and having a lubricating-oil reservoir and a conveying system for conveying lubricating oil from the lubricating-oil reservoir to the toothing engagement location between the rack and the pinion, wherein the conveying system for conveying lubricating oil comprise an oil pump, a piston of the oil pump being a pressure piece of a pressure-exerting device for pressing the rack onto the pinion.

4. The rack-and-pinion steering system as claimed in claim 3, wherein the conveying system for conveying lubricating oil comprise ducts having nonreturn valves in the steering housing.

5. The rack-and-pinion steering system as claimed in either claims 3 or 4, wherein the rack-and-pinion steering system has a distribution system for distributing lubricating oil to oil dispensing points.

6. The rack-and-pinion steering system as claimed in claim 5, wherein the distribution system for distributing lubricating oil are bodies or rings made from a material having a capillary action.

* * * * *